Sept. 15, 1959     T. L. TITZER     2,903,837
GRASS CATCHER FOR ROTARY MOWERS
Filed March 24, 1958
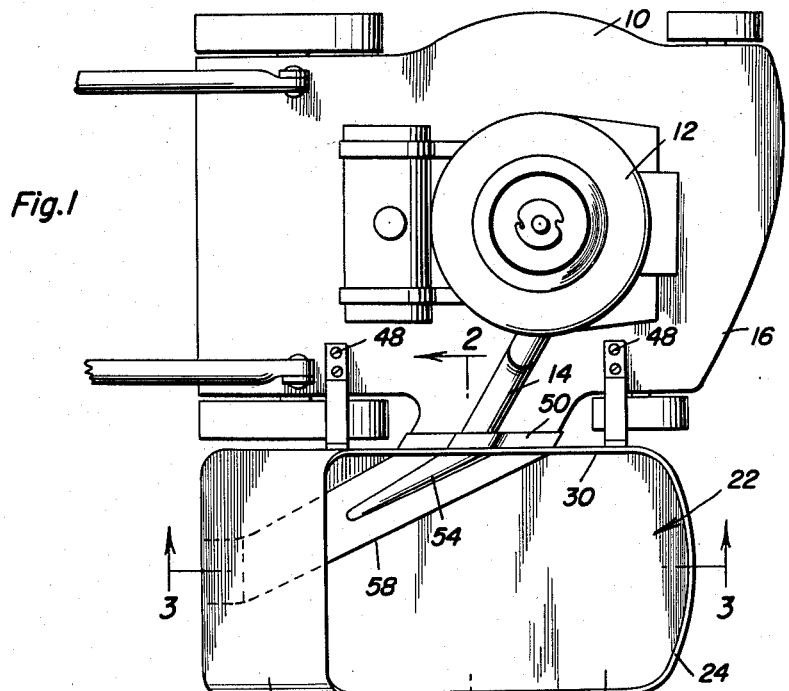
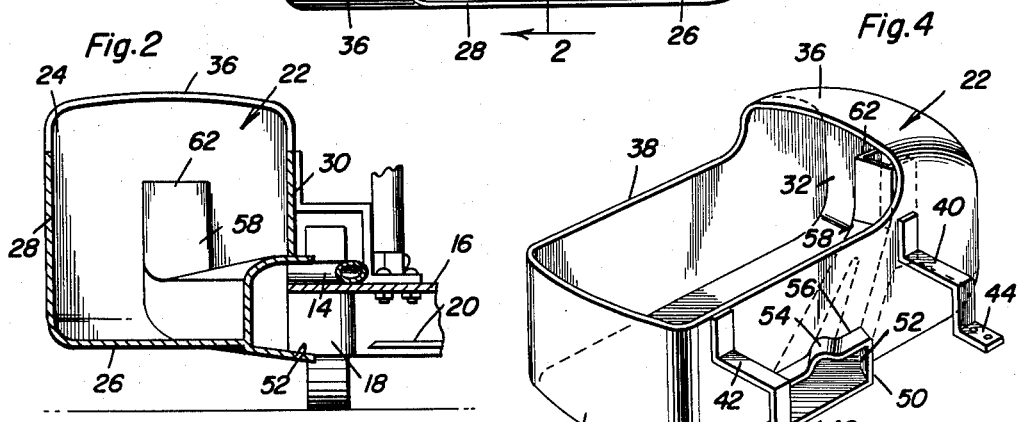
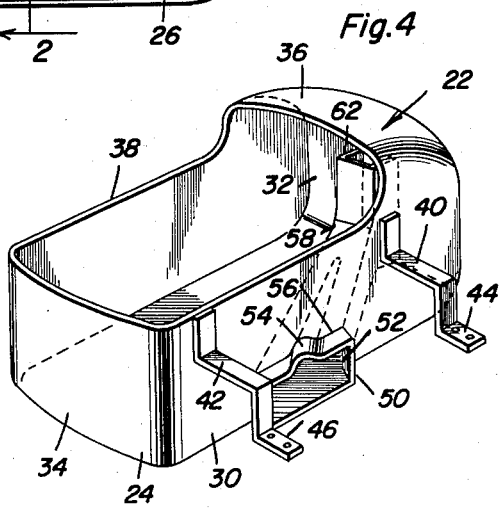
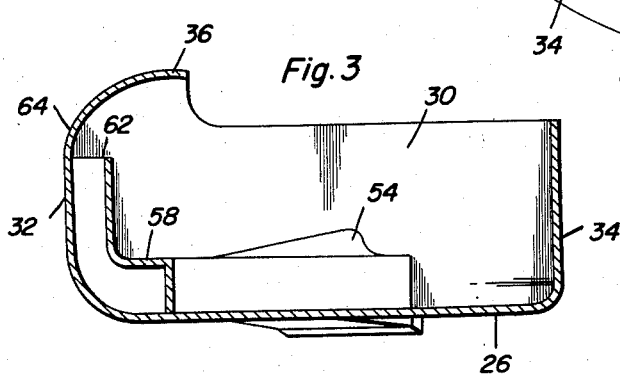
Thomas L. Titzer
INVENTOR.

United States Patent Office 2,903,837
Patented Sept. 15, 1959

2,903,837

GRASS CATCHER FOR ROTARY MOWERS

Thomas L. Titzer, Evansville, Ind.

Application March 24, 1958, Serial No. 723,351

4 Claims. (Cl. 56—202)

This invention relates to mowers and more particularly to a grass catcher for a rotary lawn mower.

The principal object of the invention is to provide a grass catcher for a rotary mower that will keep the grass in the grass catcher and prevent it from bouncing back into the mower blades. The return of the grass into the mower blade operating region is a difficulty that is encountered at the present time with a number of existing grass catchers.

Prior grass catchers, in addition to the previously mentioned difficulty, have had containers with screens through which the air that lifts the grass into the catcher is intended to pass. After a short time the holes in the screens clog with grass thereby forming a back pressure. This impedes the optimum operation of the mower. Accordingly, it is a further object of the invention to provide a grass catcher which does not create a back pressure attributed to clogged openings in screens or the like.

Another object of the invention is to provide an attachment for a mower which collects the cut grass and compels the grass to follow a path of travel which requires the grass to ultimately become stopped and accumulated within an easily detached and emptied container.

Prior grass catchers for lawn mowers have relied principally on the lifting action of the rotary blade and the propulsion by centrifugal force, of the grass to the side discharge opening in the mower housing for depositing the grass into the grass catcher. One of the important features of this invention is the construction of the catcher which enables the exhaust pipe of the rotary mower internal combustion engine to direct its blast of gas into the same duct through which the cut grass is delivered by the mower.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of a typical lawn mower having a grass catcher constructed in accordance with the invention attached thereto;

Figure 2 is a sectional view taken on the line 2—2 of Figure 1;

Figure 3 is a sectional view taken on the line 3—3 of Figure 1; and

Figure 4 is a perspective view of the grass catcher in Figure 1.

In the accompanying drawings there is shown a conventional lawn mower 10. This lawn mower is powered by an internal combustion engine 12. The most common type of internal combustion engine uses gasoline as fuel and therefore the drawing shows such an engine. Among the other structure pertinent to and required by engine 12 is an exhaust pipe 14 that is extended to the outer edge of the main housing 16 of the mower.

As shown in Figure 2 the housing has a discharge duct 18 through which the grass is propelled after having been cut by rotary blade 20. The grass catcher 22 is made of a casing 24 that has a bottom wall 26, two side walls 28 and 30, respectively, and two end walls 32 and 34, all connected to the bottom wall 26. The top wall 36 is short in that it covers only a small portion of the top of the casing leaving a rather large opening 38 in the top of the casing. This facilitates emptying the casing and provides a convenient passage for the deposit of small pebbles and other debris which may be picked up by the person using the lawn mower. Brackets 40 and 42 have angulated inner ends welded or otherwise secured to side wall 30 and angulated outer ends 44 and 46 which are attached, as by bolts 48 to the top of the mower housing 16. The bracket configuration may be altered somewhat to adapt the grass catcher to various manufacturers' makes and models of rotary lawn mowers.

A short duct 50 is attached to the side wall 30 in registry with an opening 52 in that side wall. This duct is of a size and dimension to fit over duct 18 and has a downwardly opening tunnel 54 in its top wall 56 to provide space within which exhaust pipe 14 is fitted. This tunnel is continued inwardly as duct 58 passes into the interior of the casing, tunnel 54 tapering into the duct as shown in Figure 3.

Duct 58 is shown as rectangular in cross section although this shape may be varied. It is disposed on the bottom wall 26, extending rearwardly to the rear wall 32 of the casing and then turning upwardly to its discharge end 62 which is open. The rear portion 64 of back wall 32 and the top wall 36 are smoothly curved to provide an arch above the discharge opening 62 in duct 58. As a result the arched parts of these walls function as a baffle to direct the grass laden air slightly downwardly and forwardly with respect to the grass catcher. A swirling effect is achieved with the grass making one loop as it moves along the inside surface of the back wall portion 64 and the arched top wall 36. The grass then settles in the casing.

In use, the grass catcher is bolted or otherwise attached to the lawn mower with the duct entrance 52 registered with the duct 18 of the mower. The grass due to its motion caused by centrifugal force and also caused by the aiding force of the exhaust gases 14, passes through duct 58 and moves along the inside of the casing as described. The grass comes to rest in the casing and is thereby prevented from being thrown on the lawn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a power lawn mower including a housing provided at one side thereof with a grass discharge opening and also including an internal combustion engine having an exhaust pipe disposed adjacent said discharge opening, and a grass catcher comprising an elongated casing disposed longitudinally at the side of said housing provided with said discharge opening, means attaching said casing to said housing, an elongated open ended duct having an outer end portion projecting through the side of said casing adjacent said housing and communicating with said discharge opening, said duct extending in said casing to one end of the latter and having an upturned inner end, a curved deflector member provided at said one end of the casing above the upturned inner end of said duct whereby cut grass delivered through said discharge opening and through the duct may be directed into the casing, and a tunnel-like passage provided in the outer end portion of said duct in communication therewith, said exhaust pipe discharging into said passage whereby to assist in the delivery of cut grass through the duct.

2. The device as defined in claim 1 wherein said passage has a relatively large outer end in communication with said exhaust pipe and is tapered longitudinally of said duct.

3. A grass catcher for use as an attachment to a conventional power lawn mower having a grass discharge opening and including an internal combustion engine with an exhaust pipe, said grass catcher comprising an elongated casing adapted to be attached to a lawn mower, an elongated open ended duct having an outer end portion projecting through a side of said casing and adapted to communicate with a grass discharge opening of the lawn mower, said duct extending in said casing to one end of the latter and having an upturned inner end, a curved deflector member provided at said one end of the casing above the upturned inner end of said duct whereby cut grass delivered through the duct may be directed into the casing, and a tunnel-like passage provided in the outer end portion of said duct in communication therewith and adapted to communicate with an exhaust pipe of the lawn mower whereby products of combustion from the exhaust pipe may assist in the delivery of cut grass through said duct.

4. The device as defined in claim 3 wherein said passage has a relatively large outer end and is tapered longitudinally of said duct.

References Cited in the file of this patent

UNITED STATES PATENTS

| | | |
|---|---|---|
| 2,719,396 | Morris et al. | Oct. 4, 1955 |
| 2,783,604 | Cahill, Jr. | Mar. 5, 1957 |
| 2,830,428 | Speegle, Sr. | Apr. 15, 1958 |
| 2,836,029 | Johnson | May 27, 1958 |
| 2,851,844 | Bailey | Sept. 16, 1958 |
| 2,882,668 | Murillo | Apr. 21, 1959 |